Figure 6:
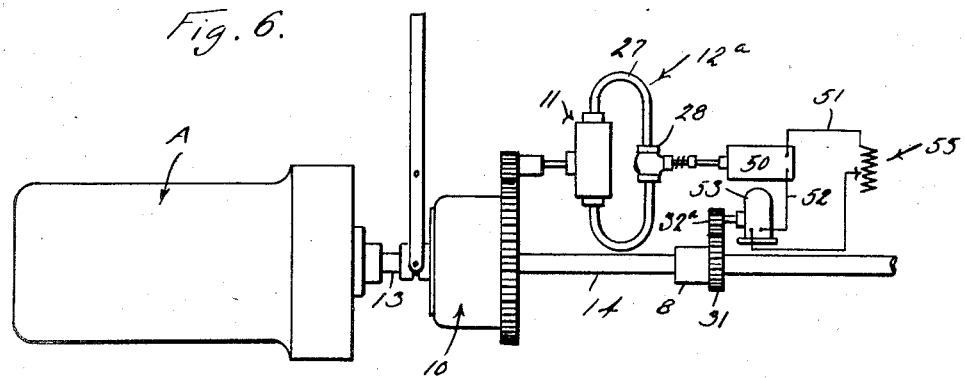

April 3, 1945.  A. L. ARMENTROUT  2,372,702
SPEED CONTROL MECHANISM
Filed Nov. 11, 1942  2 Sheets-Sheet 1
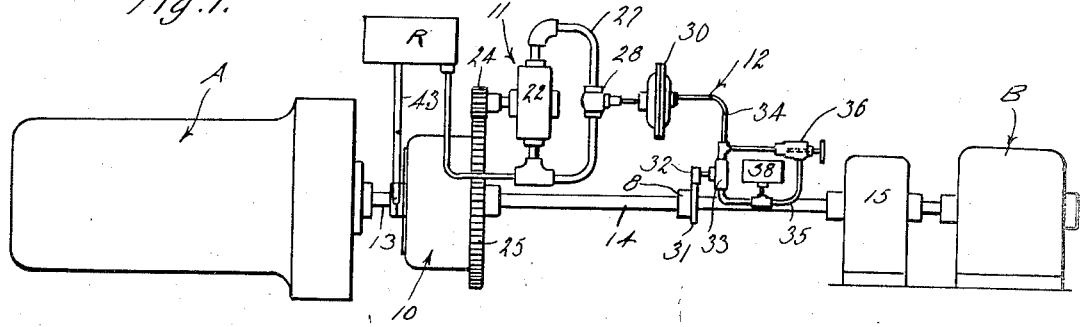
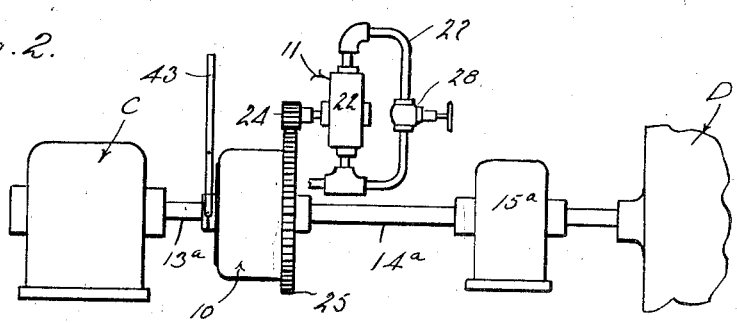
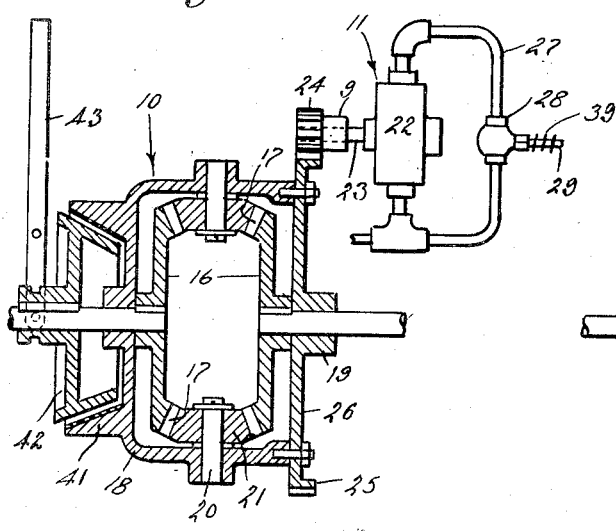
Inventor
Arthur L. Armentrout
by
Attorney April 3, 1945.　　　A. L. ARMENTROUT　　　2,372,702
SPEED CONTROL MECHANISM
Filed Nov. 11, 1942　　　2 Sheets-Sheet 2

Inventor
Arthur L. Armentrout
by
Attorney

Patented Apr. 3, 1945

2,372,702

UNITED STATES PATENT OFFICE 2,372,702

SPEED CONTROL MECHANISM

Arthur L. Armentrout, Long Beach, Calif.

Application November 11, 1942, Serial No. 465,225

6 Claims. (Cl. 74—293)

This invention relates to mechanisms for the transmission of power and relates more particularly to mechanisms for transmitting power between a driving unit and a driven unit. A general object of this invention is to provide a drive of the character referred to that is operable to provide for constant speed operation even though one of said units is characterized by variable speed operation.

Another object of this invention is to provide a drive or transmission of the character referred to that assures substantially constant speed operation of the driven unit where the speed of operation of the driving unit is variable. In many instances a driving unit which has a variable speed of operation is employed to operate a driven unit intended for uniform speed operation. For example, this is the situation where an internal combustion engine is employed to drive an electric generator. The drive mechanism of the present invention when employed in such situations is operable to maintain constant speed operation of the driven unit even though the speed of operation of the driving unit may vary considerably.

Another object of this invention is to provide a drive or transmission of the character referred to that is automatic, being operable to automatically maintain a substantially constant speed of operation of the driven unit.

Another object of this invention is to provide a constant speed drive of the character referred to that may be readily regulated to provide for any required differential in the speed of operation of the driving and driven units and to maintain substantially uniform operation of the driven unit at the selected speed. The differential in the speeds of operation of the driving unit and driven unit may be regulated at will and the driven unit will be operated at the selected rate even though the driving unit has a variable speed.

Another object of this invention is to provide a simple, practical drive or transmission that is operable to maintain a substantially constant speed of operation of a driven unit whose speed tends to vary. In many cases a drive unit having a substantially uniform speed of operation is employed to drive a driven unit such as a machine tool, or the like, whose speed is variable. The mechanism of the present invention when employed in such a combination serves to maintain a substantially constant speed of operation of the driven unit.

Another object of this invention is to provide a drive of the character referred to in the preceding paragraph that may be easily manually regulated to vary the differential in the speeds of operation of the two units as conditions of operation of the driven unit may require.

A further object of this invention is to provide a drive of the character referred to that is small, compact and self-contained and readily installed between the drive and driven units.

Figure 7:
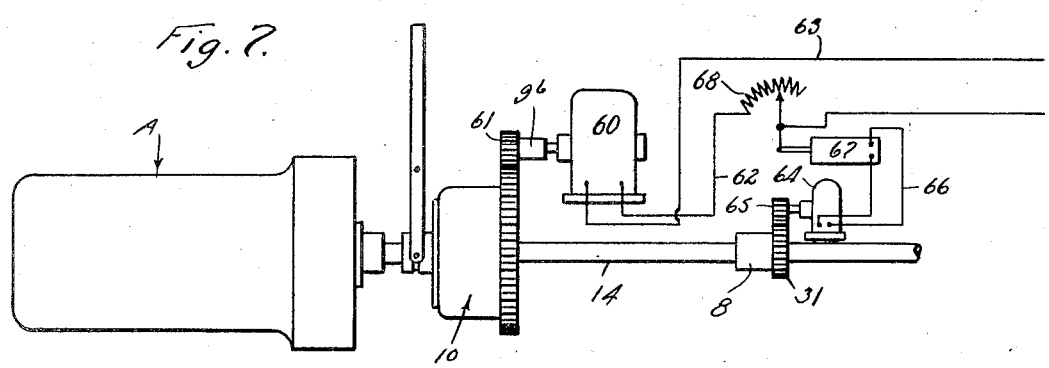

The various objects and features of my invention will be fully understood from the following detailed description of typical preferred forms and applications of the invention, throughout which description reference is made to the accompanying drawings, in which:

Fig. 1 is a side elevation of one form of the invention as used in conjunction with a variable speed drive unit and a constant speed driven unit. Fig. 2 is a side view of the drive associated with a constant speed drive unit and a variable speed driven unit. Fig. 3 is an enlarged vertical detailed sectional view of the differential gear means of the invention showing the associated fluid brake in elevation. Fig. 4 is an enlarged fragmentary side elevation illustrating the regulating means of the apparatus shown in Fig. 1. Fig. 5 is an enlarged view partly in section, illustrating the valve for controlling the fluid brake. Fig. 6 is a view similar to Fig. 1 illustrating another form of the invention, and Fig. 7 is a view similar to Fig. 6 illustrating still another form of the invention.

The drive of the present invention has numerous applications and may be varied to adapt it to given uses or installations. In the drawings I have shown two typical forms and applications of the invention, it being understood that these are merely illustrative and are not to be construed as limiting or restricting either the scope or the application of the invention.

In Fig. 1 of the drawings the drive is shown interposed between a variable speed prime mover or driving unit A in the form of an internal combustion engine, or the like, and a driven unit B in the form of an electric generator. In Fig. 2 of the drawings the drive serves to connect a constant speed drive unit C such as an electric motor and a variable speed driven unit D which may be a machine tool or any other device whose speed of operation tends to vary. Certain elements are common to the several illustrated forms of the invention and where corresponding parts appear in the several figures corresponding reference numerals are employed to designate them.

The invention as illustrated in Figs. 1, 3, 4 and 5 of the drawings may be said to comprise, generally, a differential gear unit 10 interposed between the drive unit A and the driven unit B, a fluid brake 11 associated with the differential unit 10 and a control 12 for the brake.

In the simple arrangement illustrated the shaft 13 of the drive unit A is longitudinally aligned with the driven shaft 14 and the differential gear unit 10 is connected between the two shafts. I have shown a speed change gear unit 15 associated with the driven unit B and the driven shaft 14 extends from the speed change gearing toward the drive unit A. The differential gear unit 10 comprises opposing gears 16 fixed or keyed on the opposing ends of the drive and driven shafts 13 and 14. In practice the gears 16 may have a substantial diameter and the gears are provided at their peripheries with opposed bevelled teeth 17.

The differential gear unit 10 includes a rotatable support or spider mounted to turn about the common axis of the shafts 13 and 14. In practice this rotatable support may be in the form of a housing or casing 18 enclosing the gears 16. I have shown bearings 19 on the opposite sides of the casing 18 riding on the shafts 13 and 14 to support the casing for free rotation. Aligned shafts or trunnions 20 are mounted on the casing 18 and projects into its interior. Pinions 21 are rotatable on the trunnions 20 with the casing 18 and mesh with the teeth 17 of the two opposing gears 16. The engagement of the gears 16 with the gears 21 causes independent rotation of the casing 18 unless the casing is held against such movement. If this rotation of the casing 18 is unhindered no rotation is transmitted to the driven shaft 14. On the other hand, if the casing 18 is positively held against rotation the meshing gears 16 and 21 provide a positive drive between the drive and driven shafts 13 and 14.

The fluid brake 11 is operable to control rotation of the casing 18 and thus control or govern the speed ratio of the drive between the shafts 13 and 14. The fluid brake comprises a suitable positive displacement pump arranged to be driven by the rotatable casing 18. In practice the pump of the brake means 11 may be a simple gear pump 22 arranged with its shaft 23 in parallel relation with the shaft 14. A pinion 24 is provided on the pump shaft 23 and meshes with a ring gear 25 on the casing 18. The ring gear 25 may be formed on the periphery of a plate 26 which closes an end of the casing 18. I prefer to provide the pinion 24 with an overrunning clutch 9 so that the pump shaft 23 is rotated only when the drive is serving to rotate the driven shaft 14 in the "forward" direction. The pump 22 may be supported in any appropriate manner.

The pump 22 is provided with a by-pass or circulation line 27 extending from its high pressure outlet to its low pressure inlet. It will be seen that the pump 22 serves to circulate fluid through the line 27. When the line 27 is fully open the pump 22 offers little or no resistance to rotation of the casing 18. On the other hand, if the flow through the circulation line 27 is restricted the pump 22 operates as a brake to resist rotation of the casing 18 and by slowing down the casing 18 effects a change in the speed ratio of the shafts 13 and 14, increasing the speed of rotation of the driven shaft 14. A reservoir R communicates with the low pressure side of the line 27. Valve means is interposed in the circulation line 27 so that the braking action of the pump 22 may be controlled to govern the differential gear means 10 and thus vary the speed at which the driven shaft 14 is rotated. The valve 28 for controlling the circulation line 27 is preferably a balanced valve and may be provided with a projecting operating stem 29 (see Fig. 5). It will be seen that upon operation or movement of the valve stem 29 the braking effect of the brake 11 is varied and accordingly the speed of rotation of the driven shaft 14 is changed.

The control 12 operates to automatically control the valve 28 and thus control the brake means 11 and the differential gear means 10. The control 12 is governed by the speed of rotation of the driven shaft 14. In the embodiment of the invention illustrated the control 12 includes a diaphragm means 30 for operating the valve 28. The stem 29 of the valve 28 may be directly operated by the diaphragm of the means 30. The diaphragm means 30 is operated by a pump means which in turn is driven by the driven shaft 14. A gear 31 is provided on the driven shaft 14 and meshes with a pinion 32 which is fixed on the shaft of a pump 33. The gear 31 is provided with an overrunning clutch 8 and is rotated only when the driven shaft 14 rotates in the "forward" direction. A line 34 extends from the high pressure side of the pump 33 to the fluid pressure side of the diaphragm means 30. Where the parts are related as illustrated the fluid pressure supplied to the diaphragm means 30 tends to open the valve 28. A spring 39 associated with the valve stem 29 yieldingly urges the valve 28 to the closed position. A bleed line or by-pass line 35 communicates with the pressure line 34 and extends to the low pressure side of the pump 33 and a liquid reservoir 38 communicates with the low pressure side of the line 35. The by-pass line 35 is under the control of a suitable manual valve 36. The valve 36 may be in the nature of a needle valve capable of accurate adjustment or regulation. Regulation of the valve 36 varies the rate of bleeding or by-passing of the fluid from the pressure line 34 of the diaphragm means 30. By regulating the setting of the valve 36 the diaphragm means 30 may be made to control the brake means 11 to provide for any selected differential in the speed of rotation between the drive shaft 13 and the driven shaft 14 at any given or required speed of rotation of the driven shaft 14. As the pump 33 merely serves to circulate fluid through the by-pass 35 and to develop a sufficient pressure for the operation of the diaphragm means 30 it need not be a large pump.

It may be preferred to provide a reversing means for the drive, such reversing means being particularly advantageous in marine drives. The reversing means provided by the invention includes a clutch for connecting the housing 18 with the drive shaft 13 so that the casing is positively driven by the drive shaft. With the casing 18 clutched with the drive shaft 13 the pinions 21 which mesh with the two gears 16 are locked against turning on their individual axes and this locks the two gears 16 so that they turn as a unit. This provides a positive drive between the shafts 13 and 14 in a direction which is the reverse of the direction of the normal drive through the free differential gear unit 10. The clutch means for connecting the casing 18 with the drive shaft 13 may include a clutch part 41 formed or mounted on the casing 18. A clutch member 42 is splined or slidably keyed on the drive shaft 13 and is adapted to cooperate with the clutch part 41 for the transmission of rotation to the casing 18. A shift lever 43 is pivoted between its ends and has a yoke cooperating with the clutch member 42 to move the member between the engaged and the released positions.

The overrunning clutches 8 and 9 do not transmit rotation when the casing 18 is clutched with the drive shaft 13. Thus the fluid brake 11 and the control 12 are disconnected or idle when the drive is reversed. It is to be observed that when the drive is reversed there is a positive driving connection between the drive shaft 13 and the driven shaft 14. To restore the drive to its normal condition to provide for the rotation of the shaft 14 in the forward direction the lever 43 is operated to disengage the clutch member 42 from the part 41.

In the operation of the mechanism illustrated in Figs. 1, 3, 4 and 5 of the drawings the valve 36 may be set or adjusted to provide for the normal or required speed of operation of the driven shaft 14 and the driven unit B. With the drive unit A operating at its normal or intended speed there is no change in the system. However, if the speed of operation of the drive unit A changes, due to an increased or decreased load on the primary driven element or unit (not shown) the drive means of the invention goes into operation to maintain a substantially constant speed of operation of the driven unit B. Thus in the event that the speed of the drive unit A increases the speed of the driven shaft 14 tends to increase correspondingly. An increase in the speed of rotation of the driven shaft 14 of course produces accelerated operation of the pump 33 and increased pressure is applied to the diaphragm means 30. Such increased pressure in the diaphragm means 30 tends to open the valve 28 providing for a greater volume of flow through the line 27 with a corresponding reduction in the braking action of the means 11. The resultant increase in the speed of rotation of the casing 18 causes the driven shaft 14 to be rotated at a slower rate. Thus, the increase in the speed of operation of the drive unit 11 is automatically compensated for.

In the event the speed of operation of the drive unit A is reduced the driven shaft 14 tends to turn at a slower rate. Accordingly, the pump 33 driven from the shaft 14 develops less pressure and reduced pressure at the diaphragm means 30 results in outward movement of the valve stem 29 and a decreased flow through the circulation line 27. The braking action of the brake means 11 is increased and the casing 18 is made to turn slower, thus bringing about a change in the differential drive and an increase in the speed of rotation of the driven shaft 14. This compensates for the reduction in the speed of operation of the drive unit A. The compensating drive or constant speed drive is entirely automatic in its operation but may be regulated by simple operation of the valve 36 to regulate the differential between the drive and driven shafts. When it is desired to reverse the drive the lever 43 is operated to engage the clutch member 42 with the part 41. This provides for a direct reverse drive between the shafts 13 and 14, as described above.

In Fig. 2 of the drawings the drive of the invention is interposed between a drive unit C having a constant speed and a driven unit D whose speed of operation may vary due to operating conditions. In this application of the invention the drive includes the differential gear unit 10 connected between the drive shaft 13ª and the driven shaft 14ª. The driven shaft 14ª drives the unit D through a suitable speed change gear unit 15ª. The differential gear unit 10 may be the same as in the preceding form of the invention and the fluid brake means 11 may be the same as above described. In this form of the invention the valve 28 in the circulation line 27 may be hand operated. It will be seen that by appropriate manual operation of the valve 28 a greater or lesser braking action may be obtained to obtain the desired differential in the speed of rotation of the drive shaft 13ª and driven shaft 14ª. It is to be understood that the control 12 described above may be employed when the drive is utilized as illustrated in Fig. 2. Where the control 12 is embodied in the drive it is operatively connected with the driven shaft 14ª through the gearing 31—32 as above described. With the control means 12 incorporated in the drive the mechanism serves to maintain the substantially constant speed of rotation of the driven shaft 14ª even though the driven unit D tends to vary in its rate of operation.

Fig. 6 illustrates the drive of the invention embodying another form of control 12ª. The differential gear unit 10 and the brake 11 may be the same as described above and the drive may embody the above described reversing means and reservoirs. I have shown the drive serving to connect the drive shaft 13 and the driven shaft 14. In this form of the invention the control means 12ª includes an electromagnetic means or solenoid coil 50 for operating the valve 28 of the brake 11. The electromagnetic means 50 is such that it may open the valve 28 varying extends against the action of the spring 39. The energizing circuit for the electromagnetic means 50 includes leads 51 and 52 extending from its terminals to a generator 53. The generator 53 is driven by the shaft 14. The gear 31 on the shaft 14 meshes with a gear 32ª fixed on the shaft of the generator 53. The gear 31 is connected with the shaft through the medium of an overrunning clutch 8 so that it is rotated only when the shaft rotates in the "forward" direction.

It will be seen that the speed of operation of the generator 53 is determined by the speed of rotation of the shaft 14 and that the action of the coil 50 is governed by the current supplied by the generator. When the speed of rotation of the shaft 14 is reduced less current is delivered to the coil 50 and the valve 28 moves toward its closed position restricting the flow of fluid through the line 27 thus increasing the braking action so that the speed of rotation of the shaft 14 is increased. When the speed of rotation of the drive shaft 14 increases above the normal speed the output of the generator 53 is increased and the coil 50 moves the valve 28 toward the open position permitting a greater flow of fluid through the circulating line 27. This reduces the braking action provided by the brake 11 and the speed of rotation of the shaft 14 is reduced.

A variable rheostat 55 may be connected in the lead 51 and may be operated to vary the differential in the speeds of rotation of the drive shaft 13 and driven shaft 14. It will be apparent how the rheostat 55 serves the same function as the valve 36 in the form of the invention illustrated in Figs. 1, 3, 4 and 6.

In Fig. 7 of the drawings I have illustrated the differential gear unit 10 interposed between the shafts 13 and 14 as above described. In this embodiment of the invention the rotation of the casing 18 of the differential gear unit 10 is controlled by an electric brake 60. The shaft of the electric brake 60 is provided with a gear 61 for meshing with the gear 25 on the casing 18. The gear 61 is equipped with an overrunning clutch 9ᵇ which transmits rotation to the brake shaft only when the shaft 14 is being rotated in the forward direction. The electric brake 60 is of the well known type whose braking action is proportional to the current supplied to it.

The operating and controlling circuit for the electric brake 60 includes leads 62 and 63 extending to an appropriate source of electrical energy (not shown). The brake 60 when normally or fully energized from this source may operate to positively hold the casing 18 against turning.

The energizing circuit for the brake 60 is under the control of a means responsive to the speed of rotation of the driven shaft 14. This means includes the gear 31 connected with the driven shaft 14 by the overrunning clutch 8 as described above. A suitable generator 64 is provided adjacent the gear 31. A pinion 65 is fixed on the shaft of the generator 64 and meshes with the gear 31. Leads 66 extend from the terminals of the generator 64 to an electromagnetic means or solenoid coil 67. A rheostat 68 is interposed in the brake energizing lead 62 and is under the control of the solenoid coil 67. The parts are related so that the setting of the rheostat is governed by the output of the generator 64.

With the drive of Fig. 7 conditioned for the forward drive of the driven shaft 14, the brake 60 and its control operate to maintain a substantially constant speed of rotation of the driven shaft. In the event that the speed of rotation of the driven shaft 14 increases the output of the generator 64 increases and the solenoid coil 67 changes the setting of the rheostat 68. This reduces the current being delivered to the brake 60 with the result that the casing 18 is allowed to rotate at an increased speed. An increase in the speed of rotation of the casing 18 is accompanied by a decrease in the speed of rotation of the driven shaft 14 and the increased speed of the driven shaft is automatically compensated for. In the event that the driven shaft 14 rotates at a reduced rate of speed the output of the generator 64 is correspondingly reduced and the setting of the rheostat 68 is changed so that more current is supplied to the brake 60. The brake offers increased resistance to rotation of the casing 18 so that the speed of rotation of the driven shaft 14 is increased to compensate for the unwanted change in its speed of rotation. The reversing means and the overrunning clutches 8 and 9ᵇ operate as described above.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A drive for connecting a drive shaft and a driven shaft including differential drive means interposed between said shafts and including a rotatable part whose speed of rotation determines the ratio of the speeds of rotation of the shafts, a fluid brake for governing rotation of said part, a control valve for the brake, and fluid pressure operated means responsive to the rotation of the driven shaft for controlling said valve, and including a pump driven from the driven shaft, a diaphragm for operating the valve, a pressure line connecting the pump and diaphragm, and a by-pass for regulating the pressure developed by the pump.

2. A drive for connecting a drive shaft and a driven shaft including differential drive means interposed between said shafts and including a rotatable part whose speed of rotation determines the ratio of the speeds of rotation of the shafts, a fluid brake for governing rotation of said part, a control valve for the brake, fluid pressure responsive means for operating said valve, and means operated by the driven shaft generating fluid pressure for operating the last named means including a pump driven by the driven shaft and a fluid circuit from the pump to the pressure responsive means including a by-pass.

3. A drive for connecting a constant speed shaft and a variable speed shaft including differential drive means operatively connecting the shafts and including a rotatable part whose speed of rotation governs the ratio of rotation of the shaft, brake means for controlling the rotation of said part, means responsive to the speed of rotation of the driven shaft for automatically varying the action of the brake means including a pump, a fluid pressure actuated control for the brake means, and a fluid circuit connecting the pump and the control and including a by-pass, and manual means for controlling the by-pass.

4. A drive between a variable speed drive shaft and a constant speed driven shaft comprising a differential gear drive between the shafts including a part whose speed of rotation determines the speed ratio of the drive, a fluid brake for controlling the rotation of said part, a valve for governing said brake, fluid pressure responsive means for operating the valve, pump means driven by the driven shaft for supplying fluid pressure to the pressure responsive means, and controllable by-pass means for the pump means for varying the pressure supplied to the pressure responsive means.

5. A drive between a variable speed drive shaft and a constant speed driven shaft comprising a differential gear drive between the shafts including a part whose speed of rotation determines the speed ratio of the drive, a fluid brake for controlling the rotation of said part, a valve for governing said brake, fluid pressure responsive means for operating the valve, a pump driven by the driven shaft for supplying fluid pressure to the pressure responsive means, a by-pass for connecting the intake and discharge sides of the pump, and a valve in said by-pass operable to govern the pressure supplied to the pressure responsive means.

6. A drive for connecting a constant speed shaft and a variable speed shaft including differential drive means operatively connecting the shafts and including a rotatable part whose speed of rotation governs the ratio of rotation of the shafts, brake means for controlling the rotation of said part including a pump driven by said part, a line connecting the intake and the discharge of the pump, a valve in said line, diaphragm means for operating the valve, a pump operated by one of said shafts for supplying fluid pressure to the diaphragm means, a by-pass connecting the intake and discharge ports of the pump, and a valve for controlling said by-pass.

ARTHUR L. ARMENTROUT.